United States Patent Office 3,340,203
Patented Sept. 5, 1967

3,340,203
RAPID-SETTING BITUMINOUS EMULSIONS AND METHOD FOR PREPARING SAME
Richard L. Ferm, El Cerrito, Calif., assignor, by mesne assignments, to Chevron Research Company, a corporation of Delaware
No Drawing. Filed May 27, 1965, Ser. No. 459,450
7 Claims. (Cl. 252—311.5)

ABSTRACT OF THE DISCLOSURE

An aqueous bituminous emulsion amphoteric binder is provided comprising a major amount of bitumen in the dispersed phase and hydroxylecithin and N-hydrocarbyl alkylene polyamine as the dispersants.

This invention concerns novel asphalt emulsions which find particular use as paving materials. More particularly, this invention concerns novel stable rapid-setting emulsions which find particular use as paving materials.

The term "bituminous binder" as employed in the present description refers to any bitumen emulsifiable in water with the aid of suitable emulsifiers and comprises various asphalts, e.g., natural, steam-refined, air-blown, etc., coal tar, coal-tar pitch, gilsonite, etc.

Emulsified bitumens, particularly emulsified asphalts, are widely used for road-paving work and other surfacing uses. The emulsions are applied either by distributing them, as for instance by spraying, over a base course of stone aggregate or by mixing them with the stone aggregate in mechanical mixers at the plant or in road-mixing mobile equipment, such as "Moto-Pavers" at the job site, and then spreading and compacting the mixture over the road surface being constructed or repaired.

The coarse aggregates which are combined with the bituminous binder are generally either electropositive or electronegative. Illustrative of electropositive aggregate types are limestones and dolomites. Illustrative of electronegative aggregate types are silica, such as crushed quartz, sands and granites. Generally, different types of emulsifiers are used depending on the particular aggregate to be coated, since the adhesion of the bitumen binder will vary with the electrostatic character of the aggregate.

It has now been found that rapid-setting bituminous emulsions (oil and water) can be prepared which are stable and provide good adherence to both electropositive and electronegative aggregates by emulsifying the bitumen with an aqueous solution of the combination of hydroxylecithin and N-hydrocarbyl alkylene polyamine.

The bituminous emulsions are prepared by combining under high shear conditions and elevated temperatures the bitumen, usually asphalt, and an aqueous solution of the hydroxylecithin and N-hydrocarbyl alkylene polyamine. The emulsions will generally have from about 50 to 75 weight percent of the bitumen, more usually from about 55 to 70 weight percent of the bitumen.

The bitumen which finds use will vary depending on the particular use of the final emulsion. For paving-type bitumens, asphalts having a penetration of about 85 to 300 at 77° F. (100 g., 5 seconds) (ASTM D5) will be used. The emulsion prepared with this asphalt will come within the purview of ASTM Standard Specification D244 for Emulsified Asphalt of Rapid-Setting Type.

The hydroxylecithin is a hydroxylated lecithin. For a definition of lecithin see Kirk-Othmer, Encyclopedia of Chemical Technology, The Interscience Encyclopedia, Inc., New York, 1952, volume 8, page 309. Lecithin is described as a phosphorous containing lipide consisting primarily of glycerol combined with two fatty acid radicals, phosphoric acid and choline. For the most part, commercial lecithin is derived from soy beans. The lecithin isolated from soy bean has aliphatic unsaturation present in the fatty acids. These compounds are hydroxylated by introducing, on the average, about one hydroxyl group per molecule (the method of hydroxylation introduces a glycol group, which means there is one glycol per two molecules of lecithin). The formula for hydroxylecithin is as follows:

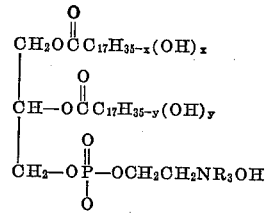

wherein R is hydrogen or methyl and the sum of $x$ and $y$ in any molecule being a cardinal number of from 0 to 2, but there being about one hydroxyl per molecule on the average in the total composition.

Small amounts of materials other than choline may be combined with the phosphorous radical. These include inositol and ethanolamine. The fatty acids are for the most part linoleic acid and linolenic acid together with other 16 carbon atom and 18 carbon atom carboxylic acids. By hydroxylecithin will therefore be intended the naturally occurring lecithin or simple equivalents thereof which have been hydroxylated on the average of at least about 0.5 hydroxyl groups per lecithin and not more than 2 hydroxyl groups per lecithin, more usually about 1 hydroxyl group per lecithin.

The N-hydrocarbyl alkylene polyamine (hydrocarbyl is an organic radical composed solely of carbon and hydrogen which may be aliphatic, alicyclic, aromatic, or combinations thereof, e.g., alkaryl and aralkyl, and may have or be free of aliphatic unsaturation, e.g., ethylenic unsaturation) will be of from 12 to 34 carbon atoms, at least 10 and not more than 30 carbon atoms being the hydrocarbyl group. Usually, the hydrocarbyl group will be of about 12 to 24 carbon atoms, more usually 16 to 24 carbon atoms. There will be present in the molecule at least 1 alkyleneamino group and not more than 4 alkyleneamino groups, usually from 1 to 2 alkyleneamino groups and preferably 1 alkyleneamino group. Illustrative of alkyleneamino is the divalent radical $-(CH_2)_nNH-$ wherein $n$ is an integer of from 2 to 3. Preferably, the hydrocarbyl group will be free of aromatic unsaturation and will be either aliphatic or alicyclic, more preferred, aliphatic.

The N-hydrocarbyl alkylene polyamine will generally have the formula:

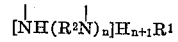

wherein $R^1$ is hydrocarbyl of from 10 to 30 carbon atoms, $R^2$ is alkylene of from 2 to 3 carbon atoms and $n$ is an integer of from 1 to 4. That is, the unsatisfied valences (indicated by ′) of the nitrogens are satisfied by hydrogen or $R^1$, $R^1$ may, therefore, be bonded to a terminal or internal nitrogen.

For the most part, the N-hydrocarbyl alkylene polyamines will have the formula:

$$R^3NH[(CH_2)_mNH]_nH$$

wherein $R^3$ is hydrocarbyl of from 12 to 24 carbon atoms, preferably of from 16 to 24 carbon atoms, and more preferred aliphatic of from 16 to 24 carbon atoms, $m$ is an integer of from 2 to 3 and preferably 3, and $n$ is an integer of from 1 to 2, preferably 1.

Since frequently the hydrocarbon radical will be derived from natural sources, the N-hydrocarbyl alkylene amine will be a mixture of products varying in the number of carbon atoms and aliphatic unsaturation. Also, depending on the source of the alkylene amine, the alkylene amine may be a mixture of compounds having an average composition. The compositions of the invention encompass both individual compounds and mixtures of compounds within the indicated formula.

Illustrative of N-hydrocarbyl alkylene polyamines are N-(tall oil derived hydrocarbon radical) 1,3-propylene diamine, N-(tallow derived aliphatic hydrocarbon radical) 1,3-propylene diamine, N-(tallow derived aliphatic hydrocarbon radical) 1,2-ethylene diamine, N-(tall oil derived hydrocarbon radical) 1,2-ethylene diamine, N-oleyl 1,3-propylene diamine, N-stearyl 1,3-propylene diamine, N-octadecadienyl 1,3-propylene diamine, N-(tall oil derived hydrocarbon radical) diethylene triamine, N,N-di(3-aminopropyl) tallow derived aliphatic hydrocarbon radical amine, N-eicosyl 1,3-propylene diamine, N-lauryl 1,2-ethylene diamine, N-hexadecyl diethylene triamine, N-(tall oil derived hydrocarbon radical) diethylene triamine, N-octadecyl dipropylene triamine, N-abietyl 1,3-ethylene diamine, etc.

In preparing the bitumen emulsions, the N-hydrocarbyl alkylene polyamine is combined with the hydroxylecithin in water in an amount to provide a final emulsion having from 0.02 to 0.5, more usually from 0.05 to 0.2 weight percent of hydroxylecithin and from 0.05 to 0.5, more usually from 0.05 to 0.2 weight percent of the N-hydrocarbyl alkylene polyamine in the finished emulsion. The weight ratio of the hydroxylecithin to the N-hydrocarbyl alkylene polyamine will generally be in the range of 1:4–4:1, more usually about 1:1. This aqueous solution is then combined with the asphalt at a ratio to provide a final emulsion having from about 50 to 75 weight percent of the bitumen.

The bitumen and aqueous solution are combined under high shear conditions to provide particles of asphalt of about 0.5 to 20 microns in diameter. The dispersion can generally be achieved by use of a colloid mill or other means known in the art.

The bitumen, usually asphalt, is introduced at a temperature in the range of about 225° to 300° F., more usually in the range of 250° to 275° F. The aqueous solution will generally range in temperature from about 70° to 125° F.

The pH of the aqueous solution will be modified to obtain a pH of from about 2 to 7, more usually from about 3 to 6, in the final emulsion. The acidic pH is conveniently obtained by the addition of mineral acids, e.g., hydrochloric acid, to the aqueous solution prior to combining with the bitumen.

Other additives may be included in the emulsion, being added during or subsequent to the preparation of the emulsion. These include clays or metallic salts in minor amounts compatible with the emulsion.

In order to demonstrate the effectiveness of emulsions prepared with the novel combination of hydroxylecithin and N-hydrocarbyl alkylene polyamines, the emulsions were tested with both silica and dolomite aggregates according to the stone coating test. (This test is somewhat modified from the test described by E. W. Mertens et al. ASTM Special Technical Publications No. 294, 68–83 (1960).) In this test, aggregate which passes through a 3″ screen and is retained on a No. 4 screen is moistened with water, and then mixed with the test emulsion and allowed to cure for 30 minutes. The emulsion is then washed with water and the amount of coating estimated visually. Thirty-five grams of emulsion are used with 465 g. of dry aggregate.

The emulsions used contained 65 weight percent of asphalt 150/200 penetration grade and 0.12 weight percent of the hydroxylecithin (soy bean lecithin having an average of one hydroxyl group per lecithin, supplied by General Mills) and 0.12 weight percent of the indicated N-hydrocarbyl alkylene polyamine. The emulsion was prepared using a colloid mill, adjusting the aqueous solution to the desired pH with hydrochloric acid, prior to introduction into the colloid mill. The asphalt was introduced at a temperature of about 250° to 275° F. simultaneously with the aqueous solution at about room temperature into the mill. The following table indicates the results obtained.

TABLE I

| Emulsifier N-hydrocarbyl alkylene polyamine | pH | Stone Coating Test, Percent Coating | |
|---|---|---|---|
| | | Silica | Dolomite |
| N-tallow 1,3-propylene diamine [1] | 3 | 95+ | 30 |
| Do | 4 | 95+ | 75 |
| Do | 5 | 95+ | 85 |
| Do | 6 | 90 | 60 |
| N-oleyl 1,3-propylene diamine [2] | 3 | 95+ | 90 |
| Do | 4 | 95+ | 85 |
| Do | 5 | 95+ | 85 |
| Do | 6 | 95+ | 85 |

[1] Supplied by Armour and Co. as Duomeen-T. The hydrocarbyl groups are derived from tallow.
[2] Supplied by Foremost Food and Chemical Company as Formonyte 808.

The emulsions were found to be stable during storage at elevated temperatures for long periods of time. A series of emulsions prepared as described in Example 1 were found to be stable at 140° F. for at least 44 days, the period of time for which the test was performed.

It is evident from the above data that excellent coating is obtained both with the electronegative silica aggregate and with the electropositive dolomite aggregate, and that the combination of hydroxylecithin and N-hydrocarbyl alkylene polyamine provides amphoteric bitumen emulsions with strong adhesion to a variety of aggregates. Moreover, the bitumen emulsions have good stability and may be stored prior to use for reasonable lengths of time.

As will be evident to those skilled in the art, various modifications on this invention can be made or followed, in the light of the foregoing disclosure and discussion, without departing from the spirit or scope of the disclosure or from the scope of the following claims.

I claim:
1. An aqueous bituminous emulsion amphoteric binder for paving having a pH in the range of 2 to 7,
which comprises
50 to 75 weight percent bitumen in the dispersed phase;
0.02 to 0.5 weight percent hydroxylecithin;
0.05 to 0.5 weight percent of an N-hydrocarbyl alkylene polyamine of from 12 to 34 carbon atoms and 1 to 3 alkyleneamino groups, wherein said hydrocarbyl is of from 10 to 30 carbon atoms and free of aromatic unsaturation,
the weight ratio of hydroxylecithin to N-hydrocarbyl alkylene polyamine being in the range of 4–1:1–4;
and the remainder water.

2. A composition according to claim 1 wherein said hydroxylecithin is present in an amount of from 0.05 to 0.2 weight percent, said N-hydrocarbyl alkylene polyamine being present in an amount of from 0.05 to 0.2 weight percent and the weight ratio of the two is about 1:1.

3. An aqueous bituminous emulsion amphoteric binder for paving having a pH in the range of 3 to 6,
which comprises
50 to 75 weight percent bitumen in the dispersed phase;
0.05 to 0.2 weight percent hydroxylecithin;
0.05 to 0.2 weight percent of an N-hydrocarbyl alkylene polyamine of the formula:

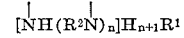

wherein $R^1$ is hydrocarbyl of from 10 to 30 carbon atoms and free of aromatic insaturation, $R^2$ is alkylene of from 2 to 3 carbon atoms and $n$ is an integer of from 1 to 3, the weight ratio of hydroxylecithin to N-hydrocarbyl alkylene polyamine being about 1:1;

and the remainder water.

4. An aqueous bituminous emulsion amphoteric binder for paving having a pH in the range of 3 to 6, which comprises 50 to 75 weight percent bitumen in the dispersed phase;

0.05 to 0.2 weight percent hydroxylecithin;

0.05 to 0.2 weight percent of an N-hydrocarbyl alkylene polyamine of the formula:

$$R^3NH[(CH_2)_mNH]_nH$$

wherein $R^3$ is aliphatic hydrocarbyl of from 12 to 24 carbon atoms, $m$ is an integer of from 2 to 3, and $n$ is an integer of from 1 to 2, the weight ratio of hydroxylecithin to N-hydrocarbyl alkylene polyamine being about 1:1;

and the remainder water.

5. A composition according to claim 4 wherein said N-hydrocarbyl alkylene polyamine is N-oleyl 1,3-propylene diamine.

6. A composition according to claim 4 wherein said N-hydrocarbyl alkylene polyamine is an N-(tallow derived aliphatic hydrocarbon radical) 1,3-propylene diamine.

7. A method for preparing an aqueous bituminous emulsion amphoteric binder for paving, which comprises combining under high shear conditions at a pH in the range of about 2 to 7, bitumen at a temperature in the range of about 225° to 300° F. with, at a temperature in the range of about 20° to 125° F., an aqueous solution of hydroxylecithin and N-hydrocarbyl alkylene polyamine of from 12 to 34 carbon atoms and 1 to 3 alkyleneamino groups, wherein said hydrocarbyl group is of from 10 to 30 carbon atoms and free of aromatic unsaturation, in amounts to provide a final composition as described in claim 1.

References Cited

UNITED STATES PATENTS 2,387,157  10/1945  Koppenhoefer _____ 252—311.5

FOREIGN PATENTS 111,080  9/1961  Pakistan.

LEON D. ROSDOL, *Primary Examiner.*

R. D. LOVERING, *Assistant Examiner.*